US010525514B2

United States Patent
Bastiaens et al.

(10) Patent No.: US 10,525,514 B2
(45) Date of Patent: Jan. 7, 2020

(54) SOIL TREATMENT DEVICE AND USE THEREOF FOR TREATING CONTAMINATED SOIL AND/OR GROUNDWATER CONTAINED THEREIN

(75) Inventors: Leen Bastiaens, Mol (BE); Ole Pilgaard Stubdrup, Aarhus N (DK)

(73) Assignees: VLAAMSE INSTELLING VOOR TECHNOLOGISCH ONDERZOEK (VITO), Mol (BE); EJLSKOV A/S, Aarhus N (DK)

( * ) Notice: Subject to any disclaimer, the term of this patent is extended or adjusted under 35 U.S.C. 154(b) by 939 days.

(21) Appl. No.: 14/005,481

(22) PCT Filed: Mar. 14, 2012

(86) PCT No.: PCT/EP2012/054501
§ 371 (c)(1),
(2), (4) Date: Apr. 24, 2014

(87) PCT Pub. No.: WO2012/123518
PCT Pub. Date: Sep. 20, 2012

(65) Prior Publication Data
US 2014/0231322 A1     Aug. 21, 2014

(30) Foreign Application Priority Data
Mar. 14, 2011   (EP) ...................................... 11158152

(51) Int. Cl.
*B09C 1/00*          (2006.01)
*B09C 1/08*          (2006.01)
(52) U.S. Cl.
CPC .................. *B09C 1/08* (2013.01); *B09C 1/00* (2013.01); *B09C 1/002* (2013.01)
(58) Field of Classification Search
CPC .. B09C 1/08; B09C 1/10; B09C 1/002; B09C 2101/00; B09C 1/00
(Continued)

(56) References Cited

U.S. PATENT DOCUMENTS

| 5,133,625 A * | 7/1992 | Albergo | ..................... B09C 1/10 |
| | | | 111/118 |
| 6,733,207 B2 * | 5/2004 | Liebert, Jr. | ............... B09C 1/00 |
| | | | 175/70 |

FOREIGN PATENT DOCUMENTS

| EP | 0 475 227 A2 | 3/1992 |
| EP | 0 925 849 A2 | 6/1999 |

(Continued)

OTHER PUBLICATIONS

European Search Report for EP 11 15 8152 dated Oct. 4, 2011.

*Primary Examiner* — Matthew O Savage
(74) *Attorney, Agent, or Firm* — Sughrue Mion, PLLC

(57) ABSTRACT

Soil treatment device for treating a contaminated soil and/or groundwater contained therein, comprising measuring means for measuring contamination of the soil, injecting means for injecting soil decontamination agents in the soil and a longitudinal soil penetration rod provided with a rod tip at an end of the soil penetration rod for moving the soil penetration rod into the soil, the outer surface of the soil penetration rod comprising a measuring section comprising at least one sensor of the measuring means for measuring contamination of the soil adjacent to the measuring section when moved into the soil and an injection section comprising at least one injection nozzle of the injecting means for injecting decontamination agent in the soil adjacent to the injection section, wherein the measuring section and the injection section are provided at longitudinally distinct locations of the soil penetration rod and in that the measuring section is closer to the rod tip than the injection section, characterized in that the distance between the injection section and the measuring section is at least 0.5 m.

15 Claims, 5 Drawing Sheets

(58) Field of Classification Search
USPC .......................... 210/143, 170.07; 405/128.5
See application file for complete search history.

(56) References Cited

FOREIGN PATENT DOCUMENTS

NL            1015275 C2    11/2001
WO       WO 9213141 A1 *   8/1992   ............... B09C 1/00

* cited by examiner

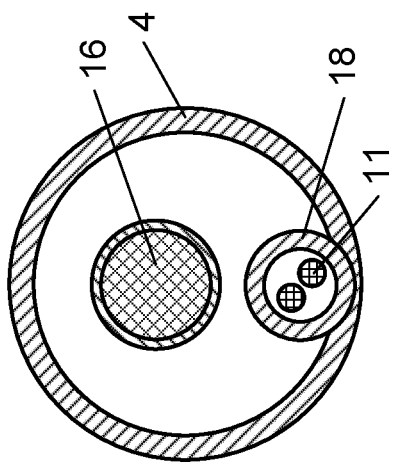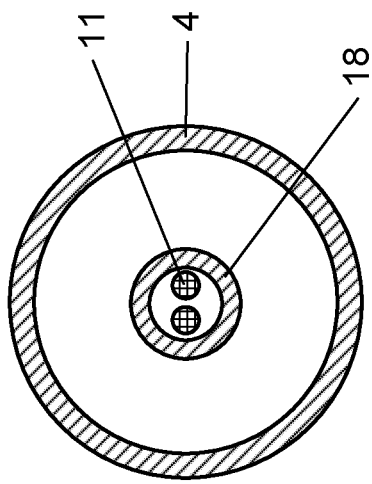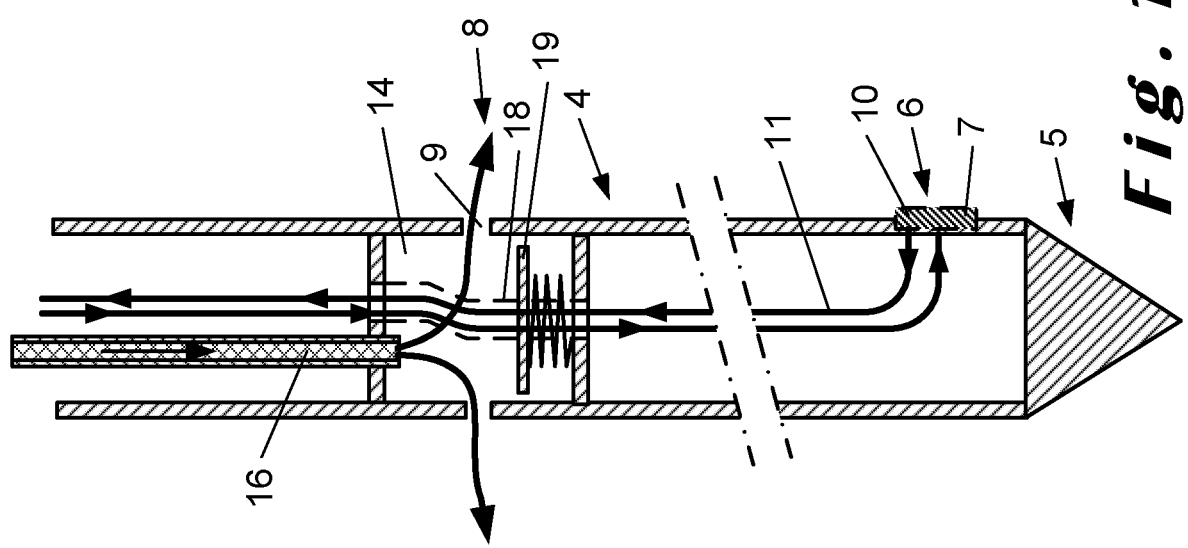

SOIL TREATMENT DEVICE AND USE THEREOF FOR TREATING CONTAMINATED SOIL AND/OR GROUNDWATER CONTAINED THEREIN

CROSS REFERENCE TO RELATED APPLICATIONS

This application is a National Stage of International Application No. PCT/EP2012/054501, filed on Mar. 14, 2012, which claims priority from European Patent Application No. 11158152.6 filed on Mar. 14, 2011, the contents of all of which are incorporated herein by reference in their entirety.

The current invention relates to a soil treatment device for treating contaminated soil and/or groundwater contained in the contaminated soil, according to the preamble of the first claim.

The present invention also relates to use of such treatment device for treating contaminated soil and/or groundwater contained in the contaminated soil.

Soil treatment devices are known to the person skilled in the art. NL1015275 for example describes a soil treatment device for treating a contaminated soil which comprises measuring means for measuring contamination of the soil, injecting means for injecting soil decontamination chemicals in the soil and a longitudinal drill rod provided with a stirring blade at a drill tip at an end of the drill rod for drilling the drill rod into the soil. The outer surface of the drill rod, more precisely near or even on the stirring blade, comprises a measuring section comprising at least one sensor of the measuring means for measuring contamination of the soil adjacent to the measuring section when drilled into the soil and an injection section comprising at least one injection nozzle of the injecting means for injecting decontamination liquid comprising at least one soil decontamination chemical in the soil adjacent to the injection section. The measuring section and the injection section are both located near the stirring blade such that the measuring means measure the contamination of the soil at the location where the decontamination liquid is mixed with the soil by the stirring blade.

However, as the measuring means measure the contamination of the soil mixed with decontamination liquid during downward movement of the drill rod, it is virtually impossible to measure the actual contamination of the soil without the decontamination liquid being present such that the soil can be optimally treated.

Therefore, it is an object of the current invention to provide a soil treatment device and use thereof with which a better treatment of contaminated soil and/or groundwater contained therein can be obtained.

This is achieved according to the soil treatment device for treating contaminated soil and/or groundwater contained therein and the use of such treatment device for treating contaminated soil and/or groundwater contained in the contaminated soil according to the independent claims.

Thereto, the measuring section and the injection section are provided at longitudinally distinct locations of the soil penetration rod and the measuring section is closer to the rod tip than the injection section.

As in such soil treatment devices the injection section and the measuring section are provided at longitudinal distinct locations, the injected decontamination agent, such as for example decontamination liquid, for example in the form of a decontamination solution, suspension, etc., decontamination gel, decontamination solid material, for example powder, decontamination gas, etc., will influence less the measured contamination of the soil and/or groundwater contained therein during downward movement of the soil penetration rod into the soil as in such configuration, the measuring section being closer to the rod tip than the injection section, the measuring section will become adjacent next to soil which has not yet been into contact with the injection section.

Although the soil treatment device may comprise protruding elements protruding from the penetration rod such as for example blades, for example propeller blades, for example for improved rotationally digging in the ground, the protruding elements possibly comprising part of the injecting means and/or the measuring means, the penetration rod itself preferably is defined as not comprising such protruding elements and is therefore, preferably, in the context of this application, considered separate from any protruding elements, such as for example separate from any blades.

Preferably, the injection section, preferably the injection nozzle, and the measuring section, preferably the sensor, are located on the same penetration rod, more preferably at longitudinal distinct locations of the rod.

The decontamination agent, such as for example decontamination liquid, for example in the form of a decontamination solution, suspension, etc., decontamination gel, decontamination solid material, for example powder, decontamination gas, etc., may for example comprise one or more of the following: chemicals, bacteria, carbon sources, activated carbon, etc.

Moreover, the for example chemicals used in decontamination agents are often abrasive. As the sensors used in such measuring means are often very sensitive, there is a risk that upon contact of the decontamination agent with the sensor, the sensor is at least partially damaged. In the soil treatment device according to the current invention, the risk that the decontamination agent contacts the sensor when driving the soil penetration rod down into the ground is greatly reduced as they are located at longitudinal distinct locations and as the measuring section is closer to the rod tip than the injection section.

In addition, as with the soil treatment device according to the current invention, the contamination of the soil can be measured with increased accuracy, the amount of the decontamination agent injected into the soil can also be better dosed, such that an improved dosing of the often expensive decontamination agents can be obtained.

According to preferred embodiments the top sensor of the at least one sensor of the measuring section and the bottom injection nozzle of the at least one injection nozzle of the injection section are provided at longitudinally distinct locations. In this context top means furthest away from the rod tip and with bottom is meant closest with respect to the rod tip. In this embodiment, preferably, the top sensor is closer to the rod tip than the bottom nozzle.

According to preferred embodiments of the current invention, the measuring means comprise a membrane interface probe (MIP) for measuring volatile organic contaminants (VOC) of the contaminated soil and/or groundwater contained in the contaminated soil, the sensor comprising a semi-permeable membrane allowing VOC to pass into a MIP sample line of the measuring means where the VOC are carried by a flow of gas to a measuring unit for chemically analyzing the VOC. As such membranes are especially sensitive to much of the used decontamination agents, especially such sensors benefit from the reduced risk that the decontamination agent contacts the sensor.

According to preferred embodiments of the current invention, the soil treatment device comprises a control unit interconnected with the measuring means and the injecting means for recording the measured contamination by the measuring means and controlling the injection of decontamination agent in the soil by the injecting means, the control unit, the measuring means and the injecting means being configured such that the control unit control the injecting means such that the injecting means inject decontamination agent in the soil at a depth depending on the contamination measured at the depth by the measuring means and recorded by the control unit. Such a control unit allows an even more improved dosing of the decontamination agent as the agent can be injected after insitu measurement of the contamination. Moreover, the control unit can for example be provided to control pressure of the injected decontamination agent, preferably decontaminated liquid, the volume of the injected agent and/or the flow rate of the injected agent. The control unit can also be provided, preferably but not necessarily in addition to control these parameters, to log these parameters for making documentation of the decontamination easier.

According to more preferred embodiments of the current invention, the control unit, the measuring means and the injecting means are configured for that measuring, recording, controlling and injecting during penetration of the soil penetration rod into the soil. In such configuration, the decontamination agent is injected at the depth almost immediately after measurement by the measuring means, further increasing the accuracy of the injection of the decontamination agent.

According to preferred embodiments of the current invention, the distance between the injection section and the measuring section is at least 0.5 m, more preferably between 0.5 m and 1 m. It has been found that such distances allow a further reduction of the risk that decontamination agent contacts the sensor.

According to preferred embodiments of the current invention, the injection section of the soil penetration rod has a reduced diameter with respect to the diameter of adjacent parts of the soil penetration rod. Such a reduced diameter allows the formation of a cylindershell-like formation of decontamination agent contacting the soil. Such a cylindershell-like formation allows a more uniform injection of the decontamination agent into the soil over a relatively large area as compared to the areas covered by the individual nozzle, possibly nozzles. Moreover, when several nozzles are provided, possibly injecting different decontamination agents, homogeneity of the decontamination agents contacting the contaminated soil and/or groundwater contained in the contaminated soil is increased, improving the treatment of the soil.

According to preferred embodiments of the current invention, the soil penetration rod comprises an injection chamber at the injection section of the soil penetration rod, the at least one nozzle interconnecting the injection chamber to the outside of the soil penetration rod, the injecting means comprising at least one injection line, for example a injection line in case the decontamination agent is a decontamination liquid, for conducting decontamination agents from at least one fluid reservoir of the injecting means containing decontamination agent to the injection chamber. Such an injection chamber allows an improved injection of the decontamination agent into the soil, especially when the injecting means comprise at least two of the injection lines, each of the injection lines being provided for conducting decontamination agent from its respective reservoir of the injecting means containing a respective decontamination agent to the injection chamber as in such an embodiment the different decontamination agents are mixed in the injection chamber before, preferably just before, being injected into the soil such that a more homogenous decontamination agent is being injected into the soil. Moreover, it becomes possible that two agents, for example two liquids, which need to chemically react which each other before being injected into the soil can be mixed in the injection chamber, and therefore react in the injection chamber, just before they are being injected into the soil, often increasing their decontamination ability.

According to further preferred embodiments of the current invention, the control unit is configured such that the control unit controls the composition of the decontamination agent injected into the soil by controlling the relative amounts of respective decontamination agents transferred to the injection chamber depending on the contamination measured at the depth by the measuring means and recorded by the control unit. Such control unit allow to further improve the use of the decontamination agents and to reduce the risk that unnecessary amounts of the decontamination agents are used as the composition of the injected agent, for example liquid agent, is adapted to the measured contamination at that depth.

According to preferred embodiments of the current invention, the nozzle has a conical cross section widening towards the outside of the soil penetration rod. Such a cross section allows to cover a relative large area, especially in combination with a reduced diameter of the injection section.

According to preferred embodiments of the current invention, the at least one nozzle comprises a sieve preventing soil from entering the injecting means and allowing the decontamination to be injected into the soil. Such a sieve allows preventing that soil enters the injection means, for example the injection chamber if present, such that the reliability of the soil treatment device is increased.

According to further preferred embodiments of the current invention, the sieve is provided in the injection chamber.

The invention also relates to use of the soil treatment device according to the invention for treating contaminated soil and/or groundwater contained therein.

According to preferred embodiments injection of the decontamination agent is performed during downward movement of the soil penetration rod into the contaminated soil and/or groundwater contained therein. It has been found that when the soil treatment device according to the current invention is used in such a way, the risk that fluid leak to other areas is decreased with respect to when injection of the decontamination agent is performed during upward movement of the soil penetration rod into the contaminated soil and/or groundwater contained therein as in such an embodiment there is a risk that the decontamination agent flows into the hole left by the soil penetration rod.

The invention will be further elucidated by means of the following description and the appended figures.

FIG. 1*a* shows a schematic overview of an embodiment of the soil treatment device according to the invention.

FIG. 1*b* shows a schematic overview of a detail of an embodiment of the soil treatment device according to the invention.

FIG. 1*c* shows a detail of cross section of FIG. 1*a*.

FIG. 1*d* shows a detail of another cross section of FIG. 1*b*.

FIG. 2*a* shows a schematic overview of a detail of an embodiment of the soil treatment device according to the invention.

FIG. 2b shows a detail of cross section of FIG. 2a.

FIG. 2c shows a detail of another cross section of FIG. 2a.

Figure 1A:
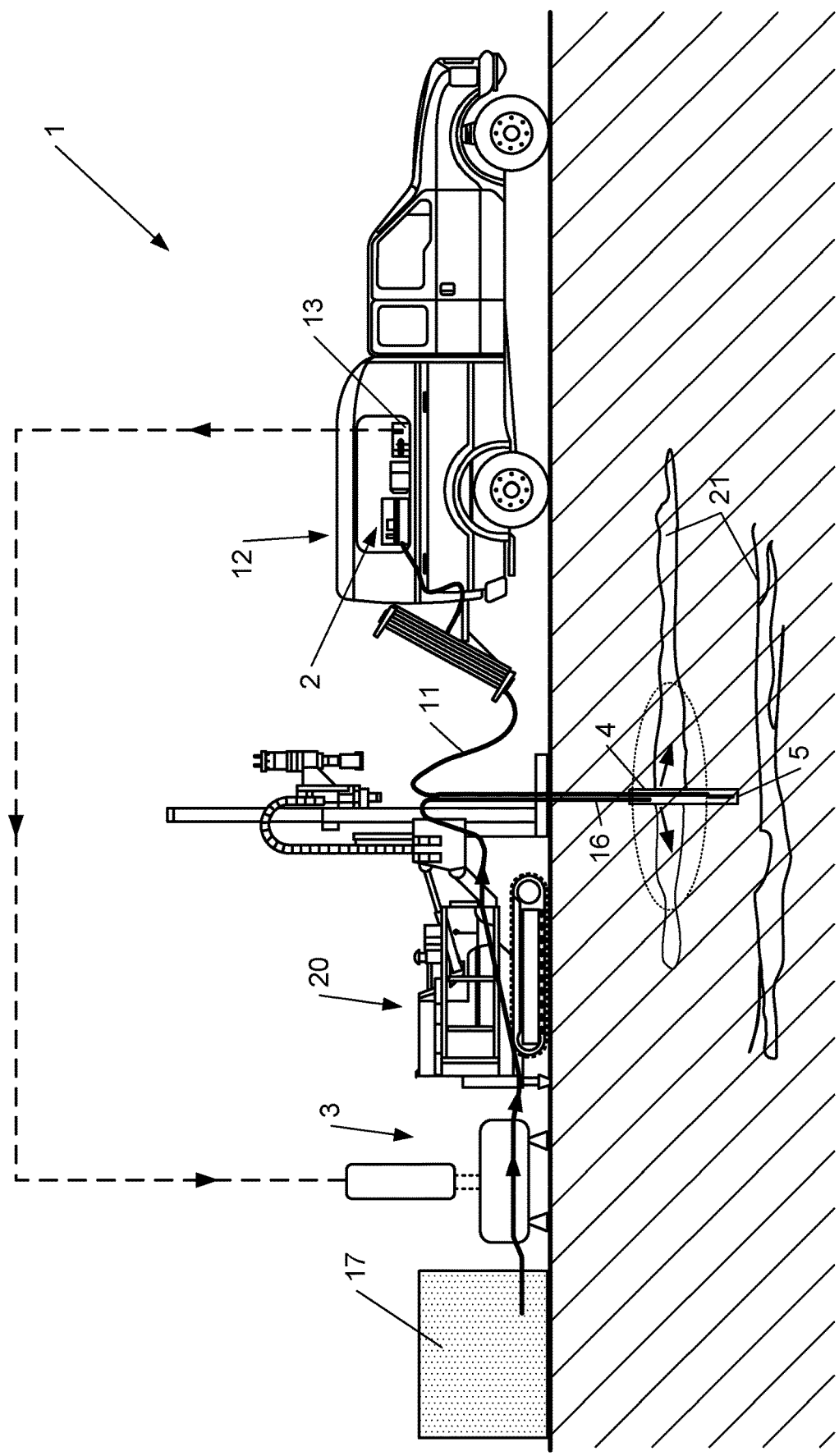

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

In the context of this application with soil is meant, although not always explicitly indicated, the soil without groundwater contained in the soil and/or groundwater contained in the soil. For example contaminated soil in this context means contaminated soil without groundwater contained in the soil and/or groundwater contained in the contaminated soil and/or contaminated groundwater contained in the soil and/or contaminated groundwater contained in the contaminated soil. By further example, soil treatment device means for example soil (without groundwater contained therein) treatment device and/or groundwater treatment device and/or soil and/or groundwater treatment device.

FIG. 1a shows a schematic overview of an embodiment of the soil treatment device 1 for treating a contaminated soil 21 according to the invention. The embodiment of the soil treatment device 1 can, alternatively or in addition, be used for treating groundwater contained in the soil 21.

The soil treatment device 1 comprises measuring means 2 for measuring contamination of the soil, injecting means 3 for injecting soil decontamination agents, for example chemicals, bacteria, carbon sources, activated carbon, etc., in the soil and a longitudinal soil penetration rod 4. The soil penetration rod 4 is provided with a rod tip 5 at an end of the soil penetration rod 4 for moving the soil penetration rod 4 into the soil. The measuring means comprise at least one sensor 7. The outer surface of the soil penetration rod 4 comprises a measuring section 6 with the at least one sensor 7 of the measuring means 2 for measuring contamination of the soil adjacent to the measuring section 6 when moved into the soil. The outer surface of the soil penetration rod 4 further comprises an injection section 8 comprising at least one injection nozzle 9, for example, as shown in the figures, in the form of an opening in the injection section 8, of the injection means 3 for injecting decontamination agent comprising at least one soil decontamination agent in the soil adjacent to the injection section 8.

It can be seen in FIG. 1a that a rig 20 is provided for moving the soil penetration rod 4 into the ground. Any type of rig 20 deemed appropriate by the person skilled in the art can be used although preferably the rig 20 has dimensions allowing it to be transported by a car or truck as shown in the figures so that the rig 20 can also be more easily repositioned. Furthermore, the rig 20 preferably is provided with transport means, such as wheels or tracks as shown in FIG. 1a. Such rigs are already known to the person skilled in the art. Preferably, the rig is a hammering rig for hammering the soil penetration rod into the soil. However, the rod can also be moved into the soil by pressing and/or drilling.

The measuring section 6 and the injection section 8 are provided at longitudinally distinct locations of the soil penetration rod 4. The measuring section is closer to the rod tip 5 than the injection section 8. This is for example illustrated in FIGS. 1b and 2a. As a preferred example of what is meant with longitudinally distinct the distance between the injection section 8 and the measuring section 6 is at least 0.5 m. More preferably, the distance between the injection section 8 and the measuring section 6 is smaller than 1 m such as to make the soil penetration rod 4 not too big, such as for example 0.6 m, 0.7 m, 0.8 m, 0.9 m. Most preferably the distance between the injection section 8 and the measuring section 6 is 0.7 m. It has been found that such a soil penetration rod 5 can be made such that it can be used in existing rigs 20.

The measuring means 2 can be any measuring means known to the person skilled in the art but preferably comprise a membrane 10 interface probe (MIP) for measuring volatile organic contaminants (VOC) of, for example, the contaminated soil 21, the sensor 7. The MIP comprises a semi-permeable membrane 10 allowing, preferably only, VOC to pass into a MIP sample line 11 of the measuring means 2 where the VOC are carried by a flow of gas to a measuring unit 12, part of the measuring means 2, for chemically analyzing the VOC. Such MIPs are known to the person skilled in the art and are readily available. As can be seen in FIG. 1a, the measuring unit 12 is mounted on a vehicle, specifically a car, more specifically a truck. This is however not critical for the invention and the measuring unit 12 can also be provided in for example a building, a container, etc. However, by providing the measuring unit 12 in a vehicle, the measuring unit 12 can be more easily transported. As often large areas of contaminated soil 21 and/or groundwater contained therein need to be treated, the transportability of the measuring unit 12 can increase the ease with which the area of contaminated soil 21 and/or groundwater contained therein can be treated. The measuring unit 12 for analyzing the VOC are also known to the person skilled in the art and are readily available.

The injecting means 3 inject the decontamination agent in the soil. Any type of decontamination agent can be used known to the person skilled in the art for decontaminating contaminated soil 21 and/or groundwater contained therein. As according to the invention the measuring section, with possibly the preferred MIP, and the injection section are provided at longitudinally distinct locations, decontamination agents previously taught to be unsuitable as they were deemed to aggressive for the sensor 7, for example the MIP, can now be used.

Preferably, the soil penetration rod 4 comprises an injection chamber 14 at the injection section 8 of the soil penetration rod 4. The at least one nozzle 9 in such an embodiment interconnects the injection chamber 14 to the outside of the soil penetration rod 4. The injecting means 3 comprises at least one injection line 16 for conducting decontamination agent from at least one reservoir 17 of the injecting means 3 to the injection chamber 14. The reservoir comprises the decontamination agent. The injection chamber 14 is for example shown in FIGS. 1b and 2a. However, although not shown in the figures, the use of an injection chamber 14 is not critical for the invention and the injection lines 16, for example fluid lines when a decontamination liquid is being used as decontamination agent, could be directly connected to the nozzle(s).

The injection chamber 14 preferably has more injection nozzles 9 than the amount of injection lines 16. Such a configuration for example allows to inject the decontamination agent at several locations at once using a single injection line 16, such as for example shown in FIG. 1b.

As can be seen in the figures the injection line 16, injection lines, preferably are provided through and inside the rod 4 such that the often fragile injection lines are protected from, for example, the soil while the rod is, for example, rotating through the soil.

Preferably, the injection chamber 14 has at least four nozzles as it has been found that such an amount of nozzles allow a good injection of the decontamination agent.

Figure 2C:
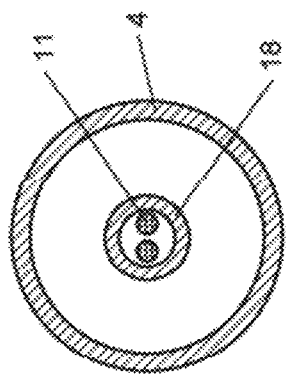
Figure 2B:
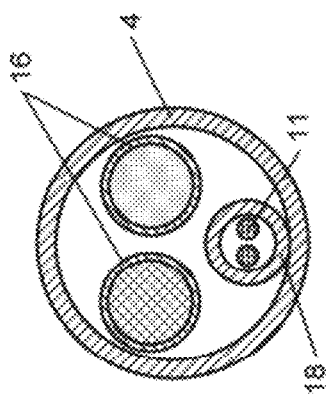
Figure 2A:
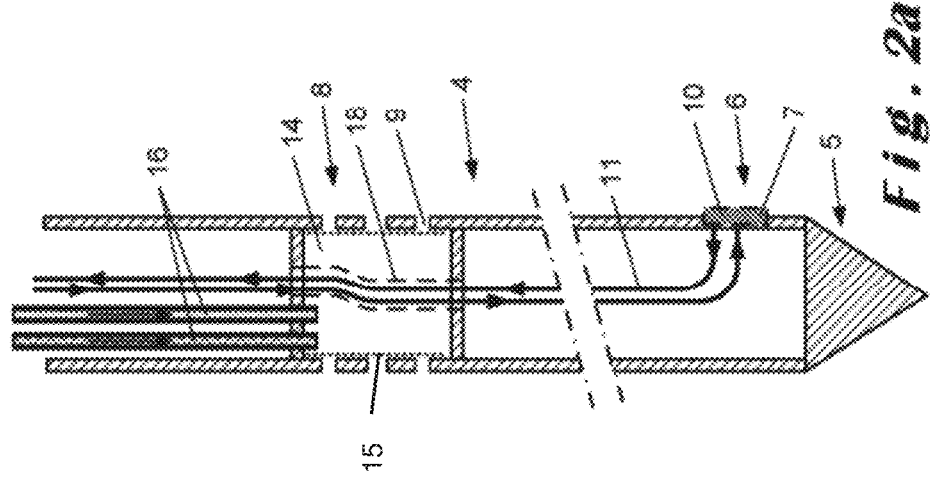

FIG. 2a shows that the injecting means 3 comprises two injection lines 16, each of the injection lines 16 being provided for conducting decontamination agent from a reservoir 17 of the injecting means 3 to the injection chamber 14. Although the decontamination agent conducted by the injection lines 16 can be the same, the injection lines 16 can also conduct different decontaminating fluids, as shown in FIG. 2a. In such a configuration, the injection lines 16 are provided for conducting decontamination agent from its respective reservoir 17 to the injection chamber 14, each reservoir containing a respective decontamination agent. The reservoirs 17 connected to the different injection lines 16 can however also be filled with the same decontamination agent.

The number of the injection lines 16 however is not critical for the invention and can for example be, although not shown in the figures, one, two or three. In some exceptional cases, also more than three, e.g. three, four, five, six, seven, etc. lines could be suitable, depending on the desired configuration. Without wanting to be bound to any theory, the number of injection lines will mostly be in function of the soil type through which penetration of the rod should be established—i.e. the fracturing limit of the soil will dictate the injection pressure and flow needed and hence the number of lines 16 needed. Typically 1 injection line will be used for a high pressure-high flow injection. Two or three lines are for example more suitable in case of a low pressure-low flow injection. Also the viscosity of the decontamination agent plays a role. In addition, two or more lines may be useful in case the decontamination agent needs to be diluted at the point of injection—one line may be used then to inject the decontamination agent while another line(s) may be used to provide the dilution agent(s). Or in case that several decontamination agents are needed at the region to be treated, more than one line may be installed to provide different decontamination agents, to be mixed at the point of injection in the region to be treated. It has further been found that practically, three lines are mostly sufficient while at the same time taking in not too much volume maintaining their practicality to be provided inside and through the rod, which is desired.

As can be seen in FIGS. 1b and 2a, the MIP sample line 11 goes through the injection chamber 14 through a MIP sample line passing tube 18. This is however not critical for the invention and the MIP sample line could, for example, also be in direct contact with the decontamination agent.

FIG. 1b shows a valve 19 present in the injection chamber 14. The valve 19 is provided such that it can close the inlet of the injection line(s) injection line(s) 16. The valve 19 shown in FIG. 1b thereto is provided as a plate, for example a metal plate, which closes the inlet of the injection line(s) injection line(s) 16 by pushing the inlet(s) closed.

Preferably, although not shown in the figures, the nozzle 9 has a conical cross section widening towards the outside if the soil penetration rod 4.

Preferably, as shown in FIG. 2a, the at least one nozzle 9 comprises a sieve 15 preventing soil from entering the injecting means 3 and allowing the decontamination agent to be injected into the soil. The sieve can for example be in the from of a, preferably metal, grid having opening with a diameter allowing the decontamination agent to pass but preventing soil to enter the injection chamber 14.

Preferably, as shown in FIG. 2a, the sieve 15 is provided in the injection chamber 14.

A detail of the soil penetration rod 4 is shown in FIGS. 1b and 2a. The soil penetration rod 4 can be any type deemed appropriate by the person skilled in the art but preferably is a rod, preferably a metal rod, more preferably a steel rod, most preferably a stainless steel rod, preferably of about 1.2 m, preferably having an overall diameter of about 5 cm.

The soil penetration rod 4 has a rod tip 5 at an end of the soil penetration rod 4 which is provided for moving the rod into the soil. Preferably the measuring section 6 and more preferably the sensor 7, preferably in the form of the membrane 10 of the MIP, is near the rod tip 5 as shown in FIGS. 1b and 2a.

Figure 3:
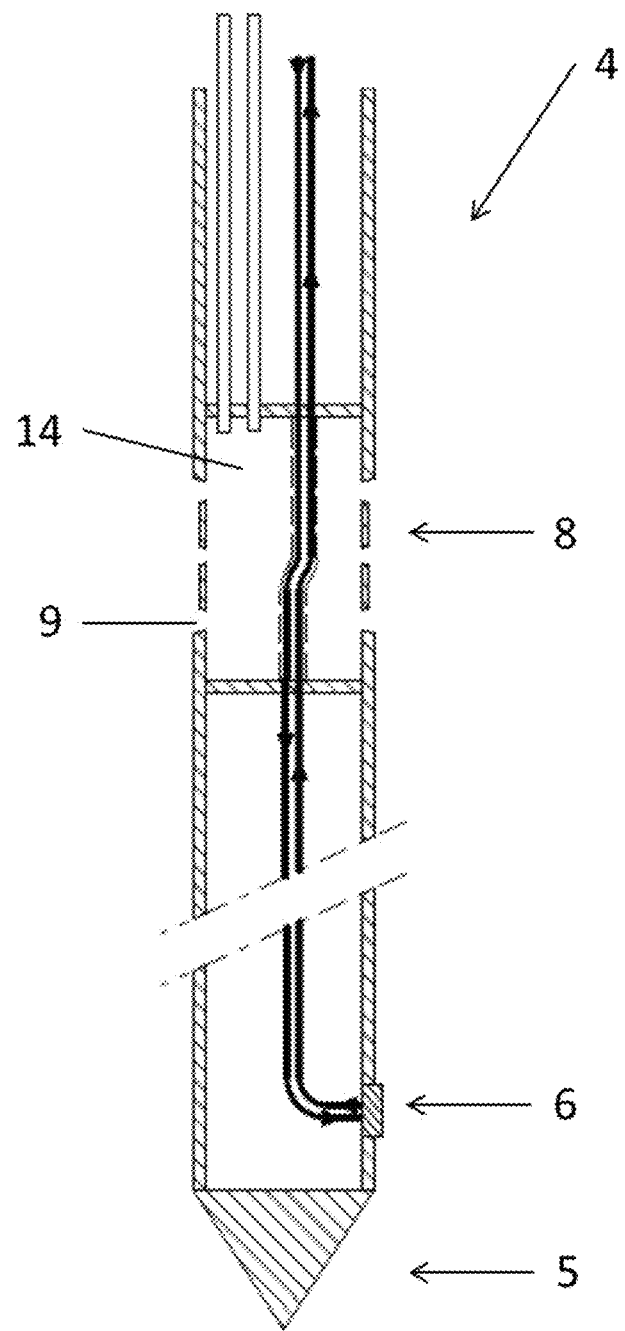
FIG. 3 shows a detail of a soil penetration rod having an injection section with reduced diameter with respect to the diameter of adjacent parts of the soil penetration rod.
Figure 4:
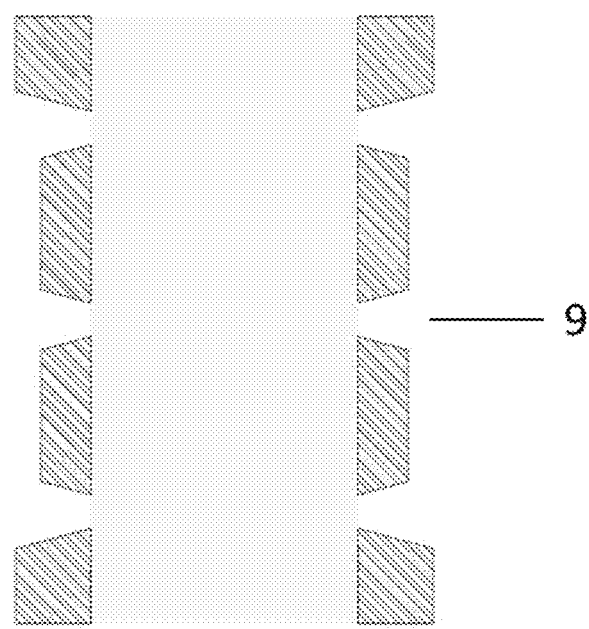
FIG. 4 shows a detail of a nozzle, provided in an injection section, having a conical cross section widening towards the outside of the soil penetration rod.

As shown in FIG. 3, the injection section 8 provided on the soil penetration rod 4 has a reduced diameter with respect to the diameter of adjacent parts of the soil penetration rod 4.

The soil treatment device 1 preferably comprises a control unit 13 interconnected with the measuring means 2 and the injecting means 3 for recording the measured contamination by the measuring means 2 and controlling the injection of decontamination agent in the soil by the injecting means 3. The connection of the control unit 13 and the injecting means 3 are indicated in FIG. 1a with a dotted arrowed line. The control unit 13, the measuring means 2 and the injecting means 3 are configured such that the control unit 13 control the injecting means 3 such that the injecting means 3 inject decontamination agent in the soil at a depth depending on the contamination measured at the depth by the measuring means 2 and recorded by the control unit 13. Thereto, the control unit 13 preferably, when recording the measured contamination, also records the depth of the measured contamination such that based on these two parameters the injecting means can be controlled. The depth of the measurement can for example be determined by the rig 20 by recording the distance travelled by the soil penetration rod 4 into the soil. In such an embodiment, the corresponding depth at which the injecting means 3 need to inject the decontamination agent into the soil is reached when after the measurement the distance between the measurement section 6 and the injection section 8 has been penetrated into the soil.

Preferably, the control unit 13, the measurement 2 and the injecting means 3 are configured for measuring, recording, controlling and injecting during moving of the soil penetration rod 4 into the soil as in such an embodiment the time for performing the decontamination of the contaminated soil 21 and/or groundwater contained therein can be significantly reduced.

For controlling the amount of decontamination agent into the soil, the control unit 13 is provided to control for example valves, pumps, etc. present in the injecting means 3. Such pumps, valves, etc. are known to the person skilled in the art.

The control unit 13 depending on the measured contamination for example increases or decreases the pressure of the decontamination agent injected into the soil, increases or decreases the rotation of the soil penetration rod 4, the speed with which the soil penetration rod 4 is driven into the ground, etc.

Preferably, the control unit 13 is provided such that the injection of decontamination agent can be stopped at any time, for example by an emergency stop button provided on the vehicle.

Preferably, the control unit is provided with a computer on which several parameters can be observed by an operator such as for example, the amount of agent injected at certain depths and/or in total, the depth reached by the rod tip 5, the time elapsed, the pressure of the injected agent, the measured contamination, the composition of the injected agent, etc.

Preferably, an operator can manually intervene before or even during injection of the decontamination agent by for example manually adapting the composition of the decontamination agent, the pressure with which the agent is injected, rotation speed of the soil penetration rod, etc.

Preferably, when using multiple injection lines 16, for example multiple conducting lines when using a decontamination liquid as decontamination agent, the control unit 13 is configured such that the control unit 13 controls the composition of the decontamination agent(s) injected into the soil by controlling the relative amounts of respective decontamination agents transferred to the injection chamber 14 depending on the contamination measured at the depth by the measuring means 2 and recorded by the control unit 13. Controlling the relative amounts of respective decontamination agents can be done by using valves, pumps or other known devices with which the relative flow of the different agents can be controlled.

FIGS. 1c and 1d show a preferred position of the injection line 16 and the sample line 11 with respect to each other at a top and a bottom of the injection chamber 14. It can be seen that the sample line 11, and the preferred sample line passing tube 18, extend from an outer region of the top part to a central region of the bottom part of the injection chamber 14. A similar configuration is shown in FIGS. 2b and 2c.

The invention further relates to use of the soil treatment device 1 for treating contaminated soil 21 and/or groundwater contained therein and to a preferred injection of the decontamination agent during downward movement of the soil penetration rod 4 into the contaminated soil 21 and/or groundwater contained therein.

The invention claimed is:

1. A soil treatment device for treating a contaminated soil and/or groundwater contained therein, comprising measuring means for measuring contamination of the soil, injecting means for injecting soil decontamination agents in the soil, and a longitudinal soil penetration rod provided with a rod tip at an end of the soil penetration rod, wherein an outer surface of the soil penetration rod comprises a measuring section comprising at least one sensor of the measuring means for measuring contamination of the soil adjacent to the measuring section when moved into the soil and an injection section comprising at least one injection nozzle of the injecting means for injecting decontamination agent in the soil adjacent to the injection section, wherein the measuring section and the injection section are located at longitudinally distinct locations of the soil penetration rod, wherein the measuring section is closer to the rod tip than the injection section, wherein the distance between the injection section and the measuring section is at least 0.5 m, wherein the soil penetration rod comprises an injection chamber at the injection section of the soil penetration rod, wherein the outer surface of the soil penetration rod at the injection section is a wall of the injection chamber, wherein the at least one injection nozzle is arranged in the wall, the at least one injection nozzle interconnecting the injection chamber to the outside of the soil penetration rod, the injecting means comprising at least one injection line extending from at least one fluid reservoir of the injecting means containing decontamination agent to the injection chamber, wherein the measuring means comprise a membrane interface probe (MIP) for measuring volatile organic contaminants (VOC) of the contaminated soil and/or groundwater contained therein, the sensor comprising a semi-permeable membrane allowing VOC to pass into a MIP sample line of the measuring means configured to carry the VOC by a flow of gas to a measuring unit for chemically analyzing the VOC, wherein the semi-permeable membrane is located in the measuring section, and wherein the MIP sample line passes through the injection chamber.

2. The soil treatment device according to claim 1, wherein the top sensor of the at least one sensor of the measuring section and the bottom injection nozzle of the at least one injection nozzle of the injection section are provided at longitudinally distinct locations.

3. The soil treatment device according to claim 1, wherein the soil treatment device comprises a control unit interconnected with the measuring means and the injecting means for recording the measured contamination by the measuring means and controlling the injection of decontamination agent in the soil by the injecting means, the control unit, the measuring means and the injecting means being configured such that the control unit control the injecting means such that the injecting means inject decontamination agent in the soil at a depth depending on the contamination measured at the depth by the measuring means and recorded by the control unit.

4. The soil treatment device according to claim 3, wherein the control unit, the measuring means and the injecting means are configured for measuring, recording, controlling and injecting during moving of the soil penetration rod into the soil.

5. The soil treatment device according to claim 1, wherein the injection section of the soil penetration rod has a reduced diameter with respect to the diameter of adjacent parts of the soil penetration rod.

6. The soil treatment device according to claim 1, wherein the injecting means comprise at least two of the injection lines, each of the injection lines being provided for conducting decontamination agent from its respective fluid reservoir of the injecting means containing a respective decontamination agent to the injection chamber.

7. The soil treatment device according to claim 6, further comprising a control unit interconnected with the measuring means and the injecting means for recording the measured contamination by the measuring means for controlling the injection of decontamination agent in the soil by the injecting means, characterized in that the control unit is configured such that the control unit controls the composition of the decontamination agent injected into the soil by controlling the relative amounts of respective decontamination agents transferred to the injection chamber depending on the contamination measured at the depth by the measuring means and recorded by the control unit.

8. The soil treatment device according to claim 1, wherein the nozzle has a conical cross section widening towards the outside of the soil penetration rod.

9. The soil treatment device according to claim 1, wherein the at least one nozzle comprises a sieve preventing soil from entering the injecting means and allowing the decontamination agent to be injected into the soil.

10. The soil treatment device according to claim 9, wherein the sieve is provided in the injection chamber.

11. The soil treatment device according to claim 1, wherein the decontamination agent, comprises one or more of the following: chemicals, bacteria, carbon sources, activated carbon.

12. The soil treatment device according to claim 1, wherein the soil penetration rod does not include blades protruding from the outer surface of the soil penetration rod at the injection section.

13. The soil treatment device according to claim 1, wherein a cross-section of the outer surface of the soil penetration rod at the injection section, perpendicular to an extending direction of the soil penetration rod, has a circular shape.

14. A method for treating contaminated soil and/or groundwater contained therein comprising the steps of:
 providing a soil treatment device according to claim 1;
 moving the soil penetration rod of the soil treatment device according to claim 1 into the soil by hammering or pressing;
 measuring contamination of the soil and/or groundwater contained therein adjacent to the measuring section when the soil penetration rod is moved into the soil;
 injecting a soil decontamination agent in the soil adjacent to the injection section of the penetration rod.

15. The method according to claim 14, wherein the injection of the decontamination agent is performed during downward movement of the soil penetration rod into the contaminated soil and/or the groundwater contained therein.

* * * * *